United States Patent
Stich et al.

[15] 3,652,308
[45] Mar. 28, 1972

[54] PROCESS FOR THE MANUFACTURE OF CEMENT CLINKER OF LOW FLUORINE CONTENT

[72] Inventors: Heinrich Stich, Linz/Danube; Kurt Ruckensteiner, Leonding near Linz/Danube; Walter Binder; Josef Hutter, both of Linz/Danube, all of Austria

[73] Assignee: Osterreichische Stickstoffwerke Aktiengesellschaft, Linz/Danube, Austria

[22] Filed: Mar. 2, 1970

[21] Appl. No.: 15,843

[30] Foreign Application Priority Data

Mar. 6, 1969    Austria ................................A2190/69

[52] U.S. Cl. .................................106/103, 106/100, 263/53
[51] Int. Cl. .........................................................C04b 7/04
[58] Field of Search ..............................106/100, 103; 263/53

[56] References Cited

UNITED STATES PATENTS

| | | | |
|---|---|---|---|
| 2,252,279 | 8/1941 | Zirngibl et al. | 106/103 |
| 2,528,103 | 10/1950 | Willson | 106/103 |
| 2,863,726 | 12/1958 | Kamlet | 106/103 |
| 3,017,246 | 1/1962 | Kamlet | 106/100 |
| 3,024,123 | 3/1962 | Theilacker | 106/103 |

Primary Examiner—James E. Poer
Assistant Examiner—W. T. Scott
Attorney—Wenderoth, Lind & Ponack

[57] ABSTRACT

Manufacture of cement clinker low in fluorine compounds from phosphoric acid byproduct gypsum by heating the gypsum itself to temperatures between 500° to 900° C. without the known additives and subsequently mixing the additives with the hot gypsum without cooling the same prior to entering the calcination furnace.

2 Claims, No Drawings

PROCESS FOR THE MANUFACTURE OF CEMENT CLINKER OF LOW FLUORINE CONTENT

This invention relates to a process for the manufacture of cement clinker of low fluorine content from phosphoric acid byproduct gypsum, which in itself contains too much fluorine, according to the gypsum-sulphuric acid process.

In the manufacture of phosphoric acid from crude phosphate and sulphuric acid, large amounts of impure calcium sulphate in the form of dihydrate, semihydrate or anhydrate are produced as byproducts. Hereinafter these varieties of calcium sulphate will be referred to simply as byproduct gypsum or just as gypsum, regardless of their actual degree of hydration.

Byproduct gypsum in phosphoric acid installations normally represents a waste material which is a nuisance and which is disposed of by tipping. Here it is frequently necessary, in addition to expending the transport costs and costs for the piece of land, also to expend high costs on rendering the soil water safe against contamination by the harmful compounds present in the gypsum, such as phosphates and fluorides.

If the factory is appropriately situated, the gypsum is also passed into rivers or into the sea, to the extent that the authorities permit.

In recent times there have been frequent attempts to employ the byproduct gypsum in the so-called gypsum-sulphuric acid process and to process it into cement and sulphuric acid.

Such a use would be particularly advantageous because it would lead to the recovery of practically all the sulphuric acid which has been consumed in the manufacture of the phosphoric acid. The sulphuric acid would thus be practically taking part in a cycle, whilst the lime component of the crude phosphate would be converted into cement clinker.

Admittedly, the phosphate and fluoride impurities again stand in the way of this use of the byproduct gypsum. Thus, under certain circumstances, clinker which can be processed to a Portland cement which meets standard specification cannot be produced from byproduct gypsum containing 1 percent or more of $P_2O_5$, since this relatively high $P_2O_5$ content could in particular have a disadvantageous influence on the development of strength in the initial stage of the cement hardening. On the other hand, an advantageous influence, that is to say an increase in strength, can be demonstrated for lower $P_2O_5$ contents on the basis of detailed investigations, for example according to Silikattechnik/ 7th year, 17, 1956 page 316.

In the case of the fluorine content in waste gypsum practical experience again shows both a favorable and an unfavorable influence depending on the concentration. Low fluorine contents up to 0.15 percent can significantly facilitate the calcination of the clinker.

In fact, however, fluorine contents in the waste gypsum are significantly higher, for example around 1 percent and from concentrations of, for example, 0.5 percent onwards also endanger the furnace lining of the rotary furnace in continuous operation, since they lower the softening point of this material in the sintering zone as a result of their known powerful flux action. Furthermore they undesirably lengthen the setting time of the cement.

Various processes for the manufacture of purer phosphate acid waste gypsum are known. Thus Belgian Pat. specifications Nos. 696,523, and 700,367 describe processes for lowering the phosphate content which employ a transition of the gypsum from one state of hydration to another. Processes for the removal of fluorine and phosphate impurities are also known in the art. Such a process is, for example, described in Belgian Pat. specification No. 660,216, wherein an extensive purification, not only to remove phosphate and fluoride but also other impurities such as magnesium oxide and alkali metal compounds, is carried out in an expensive apparatus. This process is inappropriate, too involved and too expensive if, for example, merely the fluorine content in the waste gypsum is lowered but the phosphate content is retained. The same is true for the process according to Belgian Pat. specification No. 713,349 which is concerned with the removal both of fluorine and of phosphate from waste gypsum. This process is based on reacting the fluorine compounds present, by relatively brief heating, lasting 3 to 30 minutes, with stoichiometric amounts of silica and sulphuric acid to 200° to 400° C., to give volatile compounds and at the same time converting the waste gypsum, present as dihydrate, into anhydrite by this heat treatment. The gaseous fluorine compounds formed are thereby volatilized and the phosphate is converted into a state where it can be easily eluted. In this process the waste gypsum is thus calcined twice, namely, once before and once after elution. For this reason, this process is also too expensive and even quite inappropriate if only the fluorine content is undesirably high but the phosphate content can or must remain unchanged.

Furthermore, processes are known which only lower the fluorine content in the waste gypsum. Thus, a process is known for the defluorination of gypsum containing phosphorus, from the phosphoric acid wet process, wherein when filtering the waste gypsum, a sulphuric acid content is established in the gypsum filter cake by means of appropriate amounts of sulphuric acid in the wash liquid, which suffices to decompose the solid fluorine compounds present during the subsequent calcination process, and to volatilize them. According to an example of this process the calcination takes place at 400° C. The occurrence of sulphuric acid vapors, particularly at calcination temperatures of about 400° C., must lead to considerable corrosion phenomena in continuous operation. In British Pat. specification No. 1,104,738 attention is also drawn to this circumstance when commenting on the state of the art and it is established that the addition of sulphuric acid at the requisite calcination temperature of 400° C. leads to serious corrosion problems. Pat. specification No. 1,104,738 describes a process for the defluorination of phosphoric acid waste gypsum according to which, following the addition of silicon dioxide, which should be as finely divided as possible, the material is calcined in a stream of superheated steam at a temperature between 200° and 400° C. The $SiO_2{:}F$ ratio must be at least 2:1. The disadvantage of this process is its uneconomic nature as a result of the requisite use of disproportionately large amounts of superheated steam.

It has now surprisingly been found that a very decisive reduction in the fluorine content in byproduct gypsum can be achieved quite simply without any additional expenditure by heating this gypsum, in a finely ground or finely divided or free-flowing state, in a suitable manner, for example, in crude powder pre-heaters, such as gas suspension heat exchangers, in the furnace waste gases containing sulphur dioxide, and at temperatures between 500° and 900° C., especially temperatures between 600° and 800° C., by itself, and not, as is otherwise customary, together with the crude powder additives. During this preheating a large part of the volatile fluorine compounds passes into the waste gas from which these compounds can be removed in a known manner by elution. Only after the treatment according to the invention are the additives, such as coke and sand, mixed with the byproduct gypsum and in particular this is done, according to the invention, without prior cooling of the gypsum but again with furnace waste gases containing sulphur dioxide. This has the advantage that the heat expended from the defluorination also serves to preheat the crude powder and thus, in contrast to known processes, reheating the material is dispensed with.

In this context it is known to calcine gypsum containing phosphorus at temperatures of 700° to 800° C. outside the furnace atmosphere containing sulphur dioxide and in this case the calcination at such high temperatures demands special measures as regards the apparatus, in order to reduce the disadvantagous movement of dust, and furthermore is very uneconomical as a result of the requisite subsequent cooling for the purpose of admixing the additives, for example in tube mills, and reheating in the rotary furnace.

It is furthermore known to preheat furnace powder containing sulphur trioxide, that is to say the mixture of byproduct gypsum and additives, to temperatures of 750° to 800° C. in the furnace gases. However, it was hitherto not known to be very economical to couple the preheating, which is in any case customary, with a defluorination of the merely preheated gypsum under the influence of furnace gases containing sulphur dioxide, in which process, depending on the nature of the type of gypsum, considerably lower temperatures than those hitherto known for the preheating of crude powder frequently suffice.

Accordingly the present invention provides a process for the manufacture of cement clinker of low fluorine content from phosphoric acid byproduct gypsum according to the gypsum-sulphuric acid process, by heating to a temperature above 500° C. before reduction in the calcination furnace, which comprises heating the byproduct gypsum, by itself, to a temperature within the range of 500° to 900° C., preferably 600° to 800° C., in the furnace waste gases containing sulphur dioxide and subsequently mixing known additives with the hot material without loss of heat immediately prior to entering the calcination furnace.

The defluorination of the gypsum according to the invention may be conducted in various types of apparatus. Thus, for example, the gypsum can, in the moist or predried state, be subjected to the heat treatment, under the influence of the furnace waste gases containing sulphur dioxide in a fluidized bed. However, the multistage cyclone pre-heaters known for heating the furnace powder can also be employed very advantageously for the process according to the invention if care is taken that the gypsum is in a free-flowing state as a result of appropriate predrying. In this case, the additives are admixed in one of the lower stages of the preheater, or at the end thereof, depending upon the treatment temperature.

The treatment temperature is chosen within the limits according to the invention in accordance with the type of gypsum, with the fluorine content and the nature of the fluorine compounds playing a significant role. In the case of materials having a low fluorine content a temperature of 500° to 600° C. suffices, and in the case of materials which are richer in fluorine, or if larger amounts of less volatile fluorine compounds are present, it is advisable to use an appropriately higher temperature in order to achieve the reduction of the fluorine content to the tolerated values.

For the success of the treatment according to the invention, the residence time is only of significance in as much as it has to be sufficient to ensure that the entire material is heated to the treatment temperature. In the case of pre-heaters of the cyclone type, in which the heating takes place within a few seconds, a residence time of this order of magnitude suffices, whereas in other apparatuses which do not work on the gas suspension principle, the residence time has to be chosen to be appropriately greater. Since access of the furnace atmosphere to the entire material being reacted is in any case necessary, it is advisable, when using such apparatus as drums to influence the residence time and contact with the furnace atmosphere, advantageously by having a shallow layer of material and/or agitating the material being reacted.

The following examples illustrate the process according to the invention.

EXAMPLE 1

Byproduct gypsum from a phosphoric acid installation, having a fluorine content of 0.8 percent, was heated in the anhydrous state to 800° C., in a furnace atmosphere having a sulphur dioxide content of 8 percent by volume of sulphur dioxide. At a weight loss of 0.5 percent the fluorine content after the end of the treatment was 0.09 percent.

EXAMPLE 2

Waste gypsum with a fluorine content of 0.33 percent was heated to 500° C. under the same conditions as in Example 1. After the end of the treatment the fluorine content was 0.14 percent.

After admixing 5 percent by weight of each of the additives which are customary for the gypsum-sulphuric acid process, clay, coke and sand, to the heated byproduct gypsum, that is to say the material which is at about 800° C. in the former case and about 500° C. in the latter case, a cement clinker which meets standard specifications was obtained after carrying out the usual calcination process.

What we claim is:

1. A process for the manufacture of cement clinker of low fluorine content from phosphoric acid byproduct gypsum according to the gypsum-sulphuric acid process, which comprises heating the byproduct gypsum, without any additives, to a temperature within the range of 500° to 900° C. in the sulphur dioxide-containing waste gasses produced in the calcination furnace of the hereinafter recited calcination step, mixing additives selected from the group consisting of clay, coke and sand with the resultant hot material without loss of heat and calcining the resultant mixture according to the gypsum-sulfur acid process.

2. The process according to claim 1, in which the heating is carried out a temperature of 600° to 800° C.

* * * * *